United States Patent [19]

Miura

[11] Patent Number: 4,660,698
[45] Date of Patent: Apr. 28, 1987

[54] ONE WAY CLUTCH

[75] Inventor: Osamu Miura, Shiraoka, Japan

[73] Assignee: Tok Bearing Company, Inc., Tokyo, Japan

[21] Appl. No.: 727,123

[22] Filed: Apr. 25, 1985

Related U.S. Application Data

[63] Continuation-in-part of Ser. No. 488,125, Apr. 25, 1983, abandoned.

[51] Int. Cl.[4] .............................................. F16D 41/06
[52] U.S. Cl. .......................................... 192/45; 74/446
[58] Field of Search ................. 192/41 A, 38, 45, 27; 188/82.87, 82.8; 74/446, 447, 451

[56] References Cited

U.S. PATENT DOCUMENTS

| | | | |
|---|---|---|---|
| 2,815,838 | 12/1957 | Dodge | 192/45 |
| 3,108,670 | 10/1963 | Habicht | 192/45 X |
| 3,625,324 | 12/1971 | Scharf | 192/45 |
| 3,909,086 | 9/1975 | Keleshian | 192/45 X |
| 3,990,555 | 11/1976 | Carullo | 192/45 |
| 4,003,457 | 1/1977 | Dahlstrom | 192/45 |
| 4,236,619 | 12/1980 | Kuroda | 192/45 |

Primary Examiner—Rodney H. Bonck
Assistant Examiner—David A. Testardi
Attorney, Agent, or Firm—Howard C. Miskin

[57] ABSTRACT

A one way clutch includes a tubular outer drive member formed of a thermoplastic resin and integrally formed with a torque transmitting member such as a gear or hand lever, a metal sleeve with a polygonal inside face located in the bore of and rotatable with the outer drive member, an integrally formed thermoplastic resin cage member projecting into the sleeve and having retainer spaces holding rollers engagable with respective sleeve polygonal faces, a coaxial shaft engaging the rollers which are spring biased to release positions in the wedge spaces delineated by the confronting shaft and sleeve surfaces and snap fastening means integrally formed with the cage and outer drive members locking the clutch in assembled condition. In one form the fastening means are snap interlocking annular groove and rib formed on the confronting faces of the cage and drive members and in another form the cage member includes a flange having coupling openings engaged by the barbed ends of resilient arms integrally formed with the outer drive member.

20 Claims, 9 Drawing Figures

ONE WAY CLUTCH

REFERENCE TO RELATED APPLICATION

The present application is a continuation in part of U.S. patent application Ser. No. 488,125 filed Apr. 25, 1983, now abandoned.

BACKGROUND OF THE INVENTION

The present invention relates generally to improvements in motion transmission devices and it relates particularly to an improved one way clutch.

A one way clutch of known construction includes an outer cylindrical shell member having an inside peripheral face with radially circumferentially inclined wedge surfaces, a shaft member coaxial with the shell member and a cylindrical cage member coaxially located between the shell and shaft members and retaining rollers between the shaft member and respective wedge surfaces for limited peripheral movement between wedging and releasing positions along the shaft member face and the wedge surfaces so that the shaft and shell members are rotationally interlocked or relatively released by the rollers depending on the relative rotation of the shell and shaft members. While one way clutches of the aforesaid type operate in a highly satisfactory manner and have many advantages they possess numerous drawbacks. Among these drawbacks are that these one way clutches are relatively costly devices which are difficult and time consuming to assemble, they do not lend themselves to assembly by automatic equipment, defective devices are common and they otherwise leave much to be desired.

SUMMARY OF THE INVENTION

It is a principal object of the present invention to provide an improved motion transmission or mechanical rotary coupling device.

Another object of the present invention is to provide an improved one way clutch.

Still another object of the present invention is to provide an improved one way clutch of the type in which cage retained rollers shift between wedging positions interlocking the rotary members and unwedged positions relatively uncoupling the rotary members in accordance with the relative rotation of the rotary members.

A further object of the present invention is to provide an improved one way clutch having a minimum of principal parts and which may be easily and rapidly assembled and readily lends itself to assembly with automatic equipment.

Still a further object of the present invention is to provide a device of the above nature which is rugged, reliable, compact, inexpensive, smooth running and of great versatility and adaptability.

The above and other objects of the present invention will become apparent from a reading of the following description taken in conjunction with the accompanying drawings which illustrate preferred embodiments thereof.

A one way clutch in accordance with the present invention includes an outer member rotatable about a longitudinal axis and integrally formed of a synthetic organic polymeric resin composition and having an axial cavity open at an end thereof, a sleeve resting in the cavity and rotatable with the outer member and having radially peripherally inclined wedging surfaces on its inside face, an integrally formed cage member having a base section and circumferentially spaced retainer space delineating columns projecting into the sleeve, an axial shaft and rolling elements circumferentially movable in respective retainer spaces and engagable with the shaft and respective sleeve wedge surfaces, the outer member and the cage base having integrally formed therewith snap coupling means which interlock the components of the clutch in assembled condition.

The outer member advantageously has integrally formed therewith a gear, pulley, cam, hand lever or other torque applying member and has longitudinal ribs formed on the cavity face which engage mating grooves formed in the sleeve. The inside face of the sleeve is of polygonal transverse cross section and the outer faces of the cage columns are asymmetrical dihedral angles which engage respective corners of the sleeve inside face. The cage base and the outer member have coaxial bores which function as bearing surfaces for the shaft. The rolling elements are rollers and leaf springs nesting in recesses in the columns bear on the rollers to urge them to their coupling or wedging positions. The snap fastening means locking the clutch in assembled condition advantageously includes a peripheral groove formed in the cavity face proximate its open end and a mating rib is formed on the cage base so that when the outer member is slid onto the cage the rib spreads the cavity wall to permit the passage of the rib and the wall resiliently returns to its normal condition when the groove and rib are in registry to effect their mating engagement. An alternative fastening means includes circumferentially spaced coupling openings formed in a peripheral flange on the cage base and resilient arms with hooked ends formed integrally from the cavity wall and projecting through the coupling openings with the hooked ends engaging the flange outer face.

The improved one way clutch may be easily, precisely and rapidly assembled and automatic equipment may be used to this end. The clutch is simple, rugged, reliable, compact and inexpensive and of great versatility and adaptability.

DESCRIPTION OF THE PREFERRED EMBODIMENT

Referring now to the drawings, particularly FIGS. 1 to 4 thereof which illustrate a preferred embodiment of the present invention, the reference numeral 10 generally designates the improved one way clutch which includes a rotary hollow outer member 11 which functions as an input or output drive, a wedge sleeve or ring 12, a cage member 13, a group of rollers 14 or other rolling elements, a group of roller biasing springs 16 and an output or input functioning shaft 17.

Figure 1:
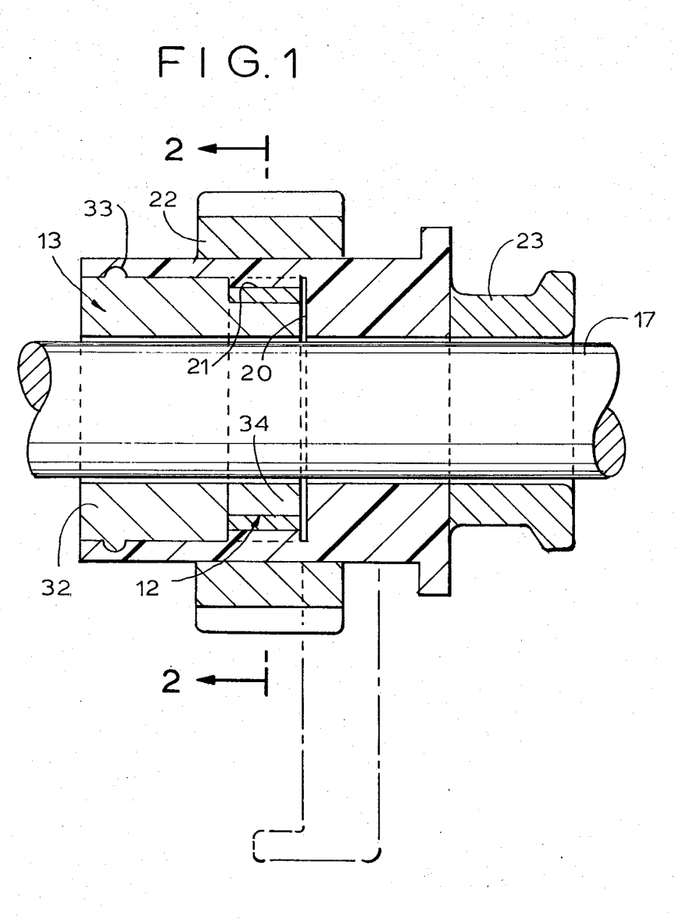
FIG. 1 is a medial longitudinal cross sectional view of a one way clutch embodying the present invention, alternative components being shown by broken line.
Figure 3:
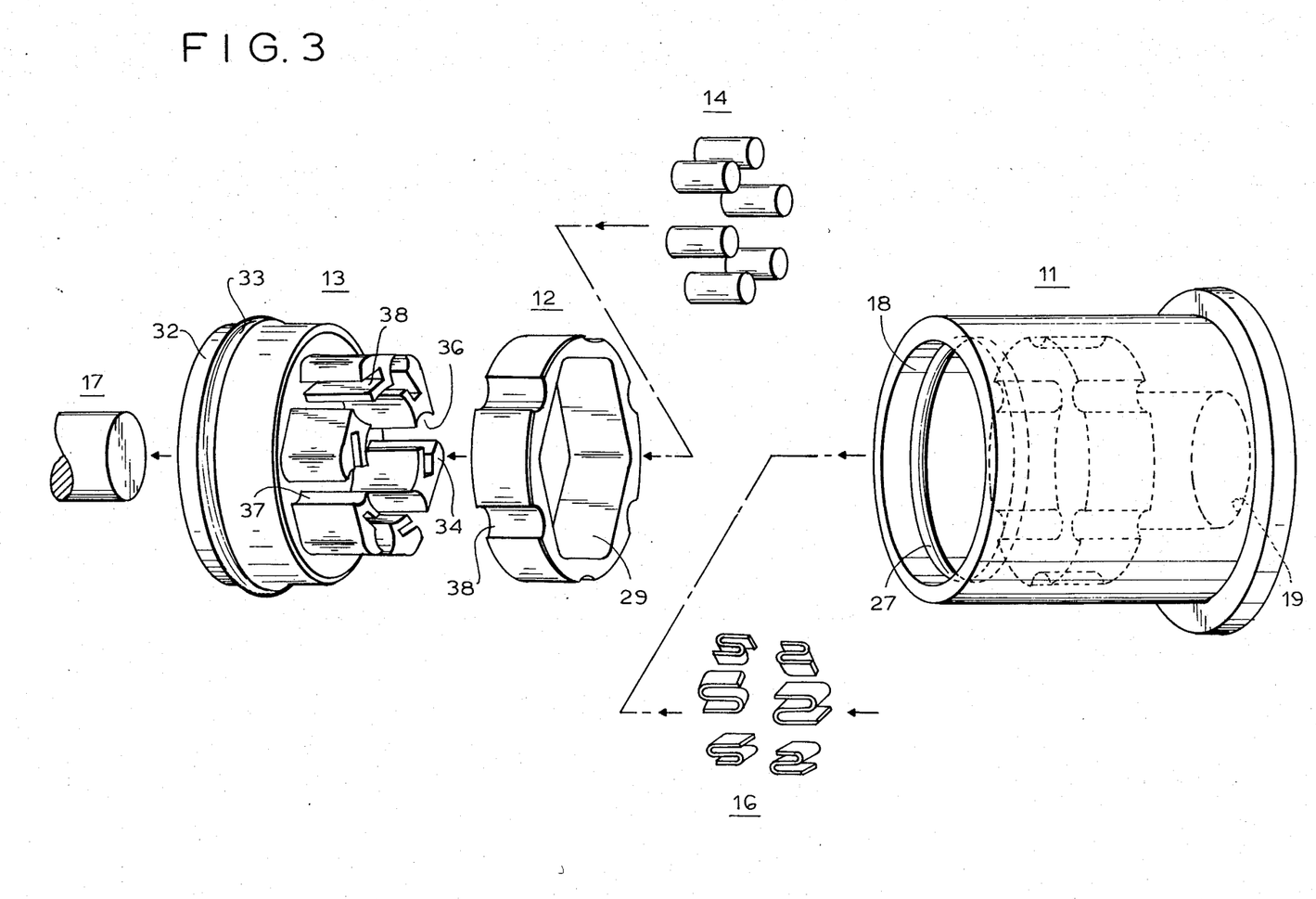
FIG. 3 is an exploded perspective view of the clutch in the sequence of assembly.

The outer member 11 is a unit integrally formed of a suitable resiliently deformable or memory possessing synthetic, organic polymeric resin composition for example nylon or the like and is produced preferably by injection molding. Outer member 11 is of general cylindrical configuration and has a circular cylindrical axial bore with an enlarged front section 18 open at its front and communicating with a reduced bearing defining rear section 19 delineated from the front section by an annular shoulder 20. Formed on the face of enlarged bore section 18 proximate its inner end are regularly circumferentially spaced short longitudinal ribs 21 of arcuate transverse cross section. Outer member 11 also has integrally formed therewith a torque transmitting section, for example, a gear 22, a pulley 23, a manually operable transversely outwardly projecting lever or arm 24, a cam 26 or the like or any desired combination of these which may be located at an end of outer member 11 or at any suitable position between its ends. Also formed in the face of enlarged bore section 18 proximate its open outer end is a snap fastener coupling defining peripheral groove 27 of arcuate transverse cross section.

Figure 2:
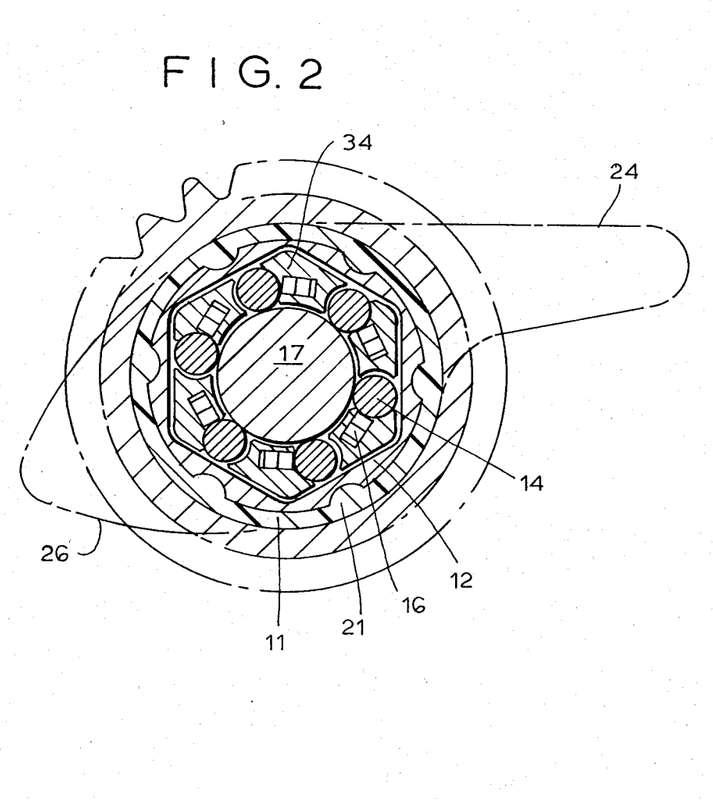
FIG. 2 is a sectional view taken along line 2—2 in FIG. 1.

The sleeve 12 is formed of metal or other hard rigid abrasive resistant material and has an outside diameter about equal to or slightly less than that of bore section 18 to permit its sliding insertion in the bore section. Formed in the outside face of sleeve 12 are equally spaced longitudinal grooves 28, the sleeve nesting in the inner end portion of bore section 18 with its front face abutting or closely proximate annular shoulder 20 and with grooves 28 matingly engaging ribs 21 so that sleeve 12 and outer member 11 rotate in unison. The inside peripheral face of sleeve 11 is of polygonal transverse cross section, hexagonal by way of example, as illustrated, the polygonal faces 29 defining wedge surfaces and successive faces forming respective dihedral angles.

The cage member 13 is formed as an integral unit of a material similar to that of outer member 11 and includes a cylindrical base 32 of a diameter corresponding to that of bore section 18. Base 32 has an axial bore coaxial with and of a diameter equal to that of bore section 19. A peripheral coupling rib 33 complementing coupling groove 27 is formed on the peripheral face of base 32 shortly forwardly of its outer end and in the assembled condition of clutch 10 matingly engages groove 27.

Projecting longitudinally inwardly from base 32 is a group, six in the illustrated embodiment, of circumferentially spaced columns 34 of lengths approximately that of sleeve 12 the confronting longitudinal end faces of successive columns 34 delineating roller retainer spaces 36. Of each pair of column confronting end faces one of the faces 37 is of concave cylindrical shape and the opposite face has formed therein a spring accommodating longitudinally extending channel 38. The outside surface of each column 34 is of asymmetrical dihedral shape including a narrow and a wide face which form a longitudinal angle equal to that between the inside polygonal faces of sleeve 12 and the inside faces of columns 34 are cylindrical and coaxial with base 32. In the assembled condition of clutch 10 columns 34 telescopically nest in sleeve 12 with the outside faces of columns 34 engaging respective inside faces of sleeve 12, retainer spaces 36 being circumferentially offset relative to respective sleeve inside faces 29, the annular border of the inside end face of base 32 abutting the confronting end face of sleeve 12 and groove 27 and rib 33 being in mating engagement to lock the assembly and contain rollers 14 and springs 16.

A roller 14 is located and circumferentially movable in each of the cage retainer spaced 36 and is restricted against longitudinal movement by the shoulder 20 and the inside end face of base 32, the roller diametrically opposite faces projecting outwardly and inwardly respectively of the loci of the column radial inside and outside faces. An S-shaped compression leaf spring 16 nests in and projects circumferentially outside of each channel 38 having one end leg bearing on the base of channel 38 and the other end leg bearing on a respective roller 14 to resiliently bias or urge the roller toward the opposing column face 37.

Shaft 17 extends coaxially through outer member 11, cage member 13 and sleeve 12 engaging bore section 19 and the bore in cage base 32 and engaging the rollers 14 as well. The cylindrical peripheral face of shaft 17 and the polygonal inside face of sleeve 12 delineate successive wedge spaces converging in a common circumferential direction and each being occupied by a respective roller 14 which is spring biased in a wedging direction. Thus, as viewed in FIG. 2, when shaft 17 is rotated clockwise it shifts rollers 14 clockwise out of wedging engagement with the confronting faces of sleeve 12 and shaft 17 to release the drive coupling between shaft 17 and outer member 11. On the other hand if shaft 17 is rotated relatively counter-clockwise, rollers 14 are urged by the shaft 17 and spring 16 counter-clockwise into wedging engagement with the sleeve and shaft confronting surfaces to effect the interlocking of shaft 17 and outer member 11 and permit the firm coupled rotation of shaft 17 and the outer member 11.

Figure 4:
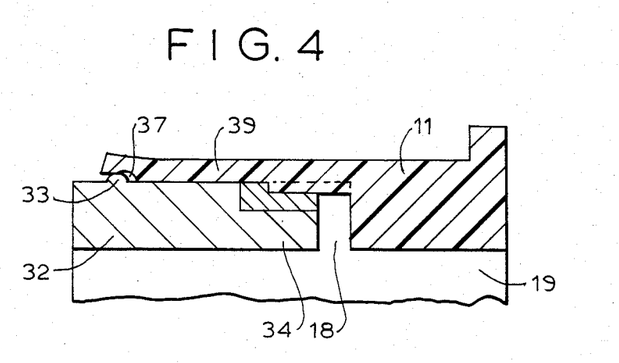
FIG. 4 is a detailed longitudinal sectional view of the clutch in the process of final assembly.

The assembly of the improved clutch 10 described above is easy and rapid and requires little skill. The sleeve 12 is slipped onto the cage defining columns 34 to the end face of base 32 and the rollers 14 and springs 16 are inserted into retainer spaces 36 and channels 38 respectively. Thereafter, the outer member 11 is coaxially slipped over the assembled cage, rollers and springs and is angularly oriented so that sleeve grooves 28 are slidably engaged by ribs 21. With the axial advance of outer member 11, as shown in FIG. 4, the leading inner edge of the cylindrical wall 39 of outer member 11 engages the curved rib 33 to resiliently radially outwardly deform wall 39 and resiliently compress rib 33 permitting the further advance of outer member 11 until the rib 33 registers with groove 27 and the wall 39 radially resiliently contracts to bring the rib and groove into mating engagement and interlock the clutch 10 in an assembled condition. The rib 33 and the resilient wall carried groove define a snap fastening.

Figure 5:
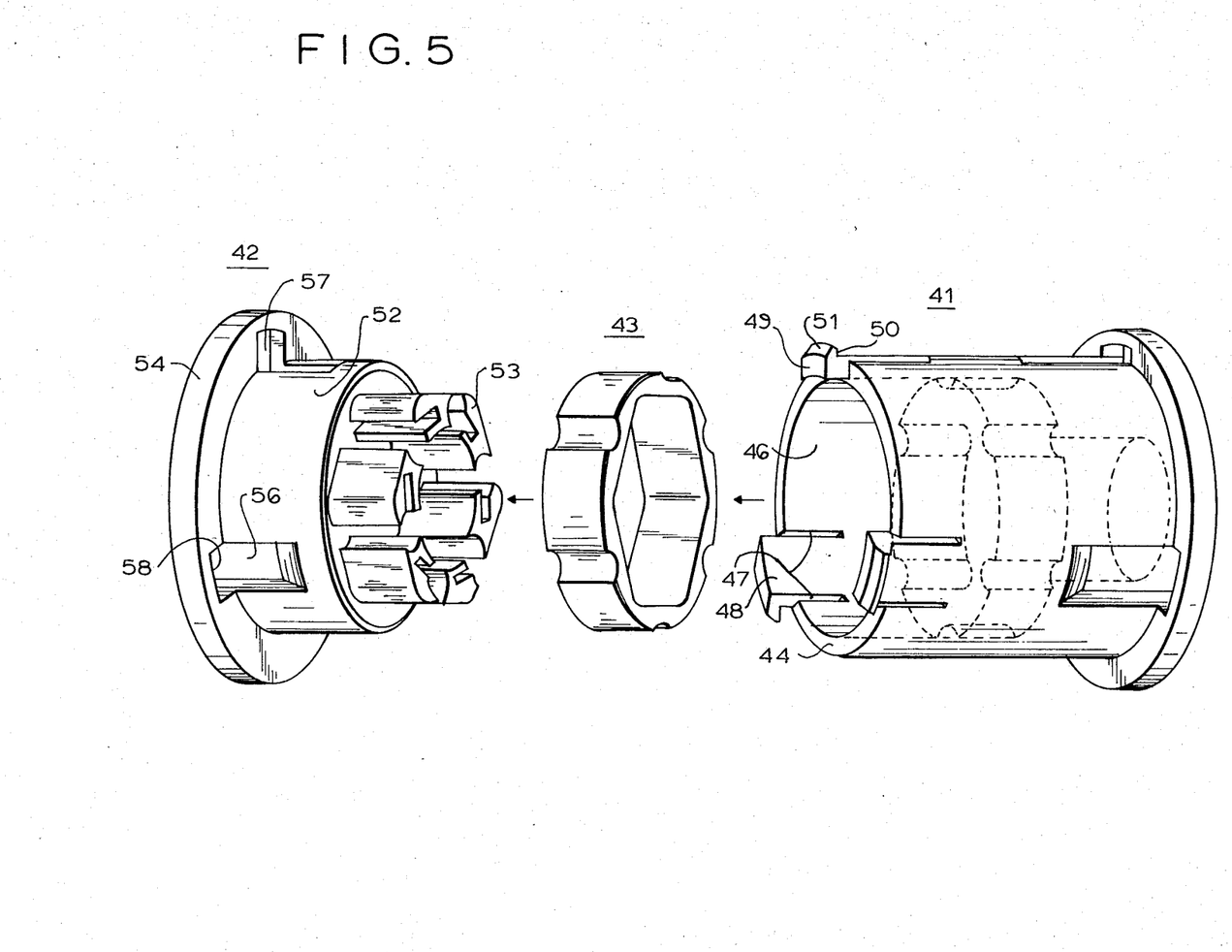
FIG. 5 is an exploded perspective view of parts of another embodiment of the present invention.
Figure 6:
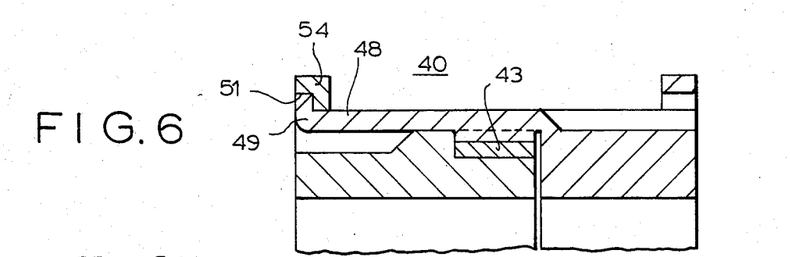
FIG. 6 is a medial longitudinal sectional view of the clutch in assembled condition.
Figure 7:
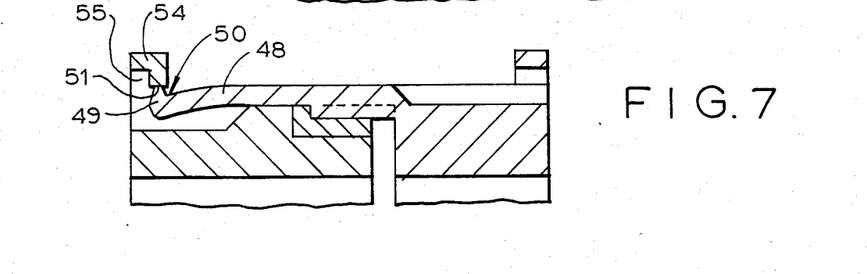
FIG. 7 is a fragmentary detailed sectional view showing the clutch assembly immediately prior to interlocking.

In FIGS. 5 to 7 of the drawings, there is illustrated another embodiment of the present invention which differs from that last described in the construction of the means for fastening or securing the clutch in assembled condition. Specifically the modified clutch 40 includes an outer member 41 and a cage member 42 corresponding in function to outer member 11 and cage member 13 described earlier, the outer member 41 being provided with an integrally formed gear or other torque transmission member. Clutch 40 also includes a sleeve 43, and rollers and springs similar in construction and relationship among themselves and the other clutch members as in the first embodiment.

The outer member 41 has formed in the relatively thin cylindrical wall 44 surrounding the enlarge bore section 46 a plurality, for example three as illustrated, of slits 47 which extend to the outer end of wall 44 and delineate longitudinal flexible arms 48. Arms 48 project beyond the edge of wall 44 and terminate in radially outwardly projecting hooks or barbs 49 having flat underfaces 50 and cam defining outer beveled edges 51.

The cage member 42 includes an axially bored cylindrical base 52 with integrally formed cage defining columns 53 as earlier described, the base 52 terminating at its outer end in a flat annular flange 54 having a stepped recess 55 along its inner peripheral edge. Three equally circumferentially spaced longitudinal channels or guideways 56 are formed in the peripheral face of base 52 and extend to flange 54 and join rectangular openings 57 formed in the inner border of flange 54 and being of dimensions permitting the passage of the hooked ends of arms 48.

The assembly and operation of clutch 40 are similar to that of clutch 10 except in the operation of the snap fastener locking means. When the outer member is axially advanced along the assembled cage member, sleeve, rollers and springs the beveled edges 50 of barbs 49 are engaged by the outer edges 58 of openings 57 to inwardly flex the advancing arms 48 to permit the passage of barbs 49 through openings 57. When the barbs 49 pass through openings 57 they are released and spring outwardly by arms 48 so that the barbs 49 engage the annular recess 55 of flange 54 to snap lock the clutch 40 in assembled condition.

Figure 8:
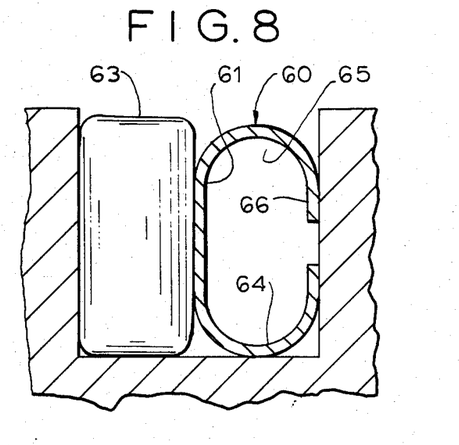
FIG. 8 is an enlarged fragmentary sectional view of the clutch cage and roller element with a modified biasing spring.
Figure 9:
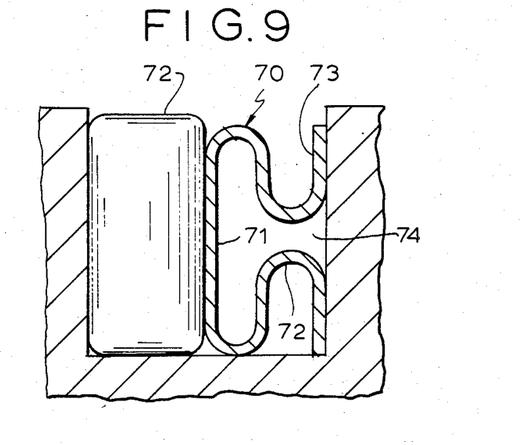
FIG. 9 is a view similar to FIG. 8 showing another form of roller biasing spring.

In FIGS. 8 and 9 of the drawings there are illustrated alternate leaf spring structures 60 for biasing the roller 14. In the form shown in FIG. 8 the spring is in the form of an ellipse or loop including along outer arm 61 bearing on roller 63 and joining at its ends curved positions 64 extending into the column recess 65 and terminating in end legs 66 projecting toward each other and delineating a slit. The end legs 66 bear on the base of recess 65. The leaf spring 70 shown in FIG. 9 includes a cross arm 71 bearing on a respective roller 72 and terminates at its opposite ends in S-shaped sections whose outer legs 73 are coplanar and bear on the base of the cage column recess 74. The springs 60 and 70 correspond in function and relationship to the other components of the clutch as those of springs 16 as earlier explained.

While there have been described and illustrated preferred embodiments of the present invention it is apparent that numerous alterations, omissions and additions may be made with out departing from the spirit thereof.

I claim:

1. A one way clutch comprising an outer member integrally formed of a polymeric resin composition rotatable about a longitudinal axis and having formed therein a longitudinal cavity open at an end thereof, a sleeve of a relatively hard material located in said cavity and interlocked and rotatable with said outer member and having on its inside peripheral face a plurality of circumferentially spaced similarly directed circumferentially radially inclined wedge surfaces, an integrally formed cage member projecting into said cavity and including an outer base section and a plurality of circumferentially spaced inwardly directed longitudinal columns delineating retainer spaces registering with respective wedge surfaces, said cage and outer members having integrally formed therewith radially relatively resiliently separable complementary fastening means interlocking said members in assembled condition against relative longitudinal movement, a roller element disposed and circumferentially movable in each of said retainer spaces and a shaft coaxially registering with said cage member, the opposite faces of said roller elements confronting the surface of said shaft and respective sleeve wedge surfaces.

2. The one way clutch of claim 1 wherein said outer member has formed on the surface of said cavity circumferentially spaced longitudinal ribs and said sleeve has formed in its outside peripheral face circumferentially spaced longitudinal grooves engaging said ribs.

3. The one way clutch of claim 1 wherein said cavity has a circular shoulder at its inner end, the inner end face of said sleeve abutting said shoulder and said cage member base having a front annular end face abutting the outer end of said sleeve.

4. The one way clutch of claim 2 wherein the outer edge of each of said resilient arms and lips is beveled to define an arm flexing cam.

5. The one way clutch of claim 4 wherein each of said resilient arms is delineated from the wall of said cavity by a pair of circumferentially spaced longitudinal slits formed in said cavity wall and longitudinally extending clearance grooves are formed in the outside face of said cage member base section and are aligned with respective flange openings.

6. The one way clutch of claim 1 wherein the inside peripheral face of said sleeve is of polygonal transverse cross section and the outside face of each cage column comprises a dihedral angle engaging a respective corner of said sleeve inside face.

7. The one way clutch of claim 1 wherein said roller elements are cylindrical rollers.

8. The one way clutch of claim 7 including spring means resiliently urging each of said rollers in a peripheral direction into wedging engagement with said shaft and sleeve.

9. The one way clutch of claim 8 wherein each of said columns has a recess formed therein opening into a respective retainer space and said spring means comprises a compression leaf spring engaging each of said recesses and entrapped between a column and a respective roller.

10. The one way clutch of claim 9 wherein said spring is S-shaped.

11. The one way clutch of claim 9 wherein said leaf spring is in the shape of an open loop.

12. The one way clutch of claim 9 wherein said spring comprises a cross arm bearing on a respective roller and terminating at opposite ends in S-shaped legs nesting in a respective column recess.

13. The one way clutch of claim 1 wherein said outer member includes a torque transmitting section integrally formed therewith.

14. The one way clutch of claim 13 wherein said torque transmitting section comprises a gear coaxial with said outer member.

15. The one way clutch of claim 13 wherein said torque transmitting member comprises an outwardly transversely projecting actuating arm.

16. The one way clutch of claim 13 wherein said torque transmitting member comprises a cam.

17. The one way clutch of claim 1 wherein said outer member has formed therein in communication with the inner end of said cavity a coaxial bore rotatably bearing said shaft.

18. A one way clutch comprising an outer member integrally formed of a polymeric resin composition rotatable about a longitudinal axis and having formed therein a longitudinal cavity open at an end thereof, a sleeve of a relatively hard material located in said cavity and interlocked and rotatable with said outer member and having an inside peripheral face, an integrally formed cage member projecting into said cavity and including an outer base section and a plurality of circumferentially spaced inwardly directed longitudinal columns delineating retainer spaces, a rotatable inner drive member coaxial with said sleeve and outer drive member and having an outer peripheral faces delineating with said sleeve inside face a plurality of circumferentially spaced wedge spaces each containing a respective one of said retainer spaces, said cage and outer members having integrally formed therewith relatively radially resiliently movable complementary fastening means interlocking said members in assembled condition against relative longitudinal movement, a roller element disposed and circumferentially movable in each of said retainer spaces between wedging and release positions in respective wedge spaces to respectively drive couple and uncouple said drive members.

19. A one way clutch comprising an outer member integrally formed of a polymeric resin composition rotatable about a longitudinal axis and having formed therein a longitudinal cylindrical cavity open at an end thereof and having a peripheral groove formed therein at said end, a sleeve of a relatively hard material located in said cavity and interlocked and rotatable with said outer member and having on its inside peripheral face a plurality of circumferentially spaced similarly directed circumferentially radially inclined wedge surfaces, an integrally formed cage member projecting into said cavity and including an outer cylindrical base section telescoping said cavity and having a peripherally extending rib snap fit into engagement with said peripheral groove, and a plurality of circumferentially spaced inwardly directed longitudinal columns delineating retainer spaces registering with respective wedge surfaces, said cage and outer members having integrally formed therewith complementary fastening means interlocking said members in assembled condition against relative longitudinal movement, a roller element disposed and circumferentially movable in each of said retainer spaces and a shaft coaxially registering with said cage member, the opposite faces of said roller elements confronting the surface of said shaft and respective sleeve wedge surfaces.

20. A one way clutch comprising an outer member integrally formed of a polymeric resin composition rotatable about a longitudinal axis and having formed therein a longitudinal cavity open at an end thereof, a sleeve of a relatively hard material located in said cavity and interlocked and rotatable with said outer member and having its inside peripheral face a plurality of circumferentially spaced similarly directed circumferentially radially inclined wedge surfaces, an integrally formed cage member projecting into said cavity and including an outer base section having at its outer end a peripheral flange with peripherally spaced openings and a plurality of circumferentially spaced inwardly directed longitudinal columns delineating retainer spaces registering with respective wedge surfaces, said outer member having integrally formed therewith longitudinally extending resilient arms projecting through the respective flange openings and terminating in radially outwardly projecting lips bearing on the outside face of said flange and defining therewith fastening means interlocking said members in assembled condition against relative longitudinal movement, a roller element disposed and circumferentially movable in each of said retainer spaces and a shaft coaxially registering with said cage member, the opposite faces of said roller elements confronting the surface of said shaft and respective sleeve wedge surfaces.

* * * * *

REEXAMINATION CERTIFICATE (1787th)
United States Patent [19]

Miura

[11] B1 4,660,698

[45] Certificate Issued  Sep. 15, 1992

[54] ONE WAY CLUTCH

[75] Inventor: Osamu Miura, Shiraoka, Japan

[73] Assignee: Tok Bearing Company Ltd., Japan

Reexamination Request:
No. 90/002,000, Apr. 13, 1990

Reexamination Certificate for:
Patent No.: 4,660,698
Issued: Apr. 28, 1987
Appl. No.: 727,123
Filed: Apr. 25, 1985

[51] Int. Cl.$^5$ .................................. F16D 41/06
[52] U.S. Cl. .................................. 192/45; 74/446

[56] References Cited
U.S. PATENT DOCUMENTS

| | | | |
|---|---|---|---|
| 3,108,670 | 10/1963 | Habicht | 192/27 |
| 3,734,579 | 5/1973 | Schumacher | 384/43 |
| 3,820,640 | 6/1974 | Marola et al. | 192/45 |
| 3,909,086 | 9/1975 | Keleshian | 192/45 X |
| 3,993,177 | 11/1976 | Gehrke | 192/45 |
| 4,003,457 | 1/1977 | Dahlstrom | 192/45 |
| 4,181,374 | 1/1980 | Ernst et al. | 384/584 |
| 4,236,619 | 12/1980 | Kuroda | 192/45 |
| 4,654,754 | 3/1987 | Daszkowski | 361/388 |
| 4,682,901 | 7/1987 | Hauber | 384/539 |

FOREIGN PATENT DOCUMENTS

| | | |
|---|---|---|
| 3309233 | 9/1983 | Fed. Rep. of Germany . |
| 53-4182 | 2/1978 | Japan . |
| 57-184324 | 11/1982 | Japan . |
| 58-142424 | 9/1983 | Japan . |
| 2117066 | 10/1983 | United Kingdom . |

*Primary Examiner*—Richard M. Lorence
*Attorney, Agent, or Firm*—Martin Fleit; John Clarke Holman; Marvin R. Stern

[57] ABSTRACT

A one-way clutch includes a tubular outer drive member formed of a thermoplastic resin and integrally formed with a torque transmitting member such as a gear or hand lever, a metal sleeve with a polygonal inside face located in the bore of and rotatable with the outer drive member, an integrally formed thermoplastic resin cage member projecting into the sleeve and having retainer spaces holding rollers engagable with respective sleeve polygonal faces, a coaxial shaft engaging the rollers which are spring biased to release positions in the wedge spaces delineated by the confronting shaft and sleeve surfaces and snap fastening means integrally formed with the cage and outer drive members locking the clutch in assembled condition. In one form the fastening means are snap interlocking annular groove and rib formed on the confronting faces of the cage and drive members and in another form the cage member includes a flange having coupling openings engaged by the barbed ends of resilient arms integrally formed with the outer drive member.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *